Figure 1:
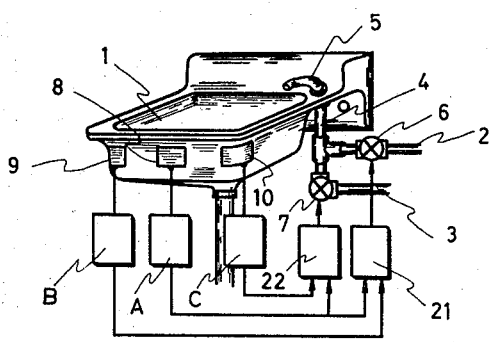

Dec. 10, 1968  MITITAKA YAMAMOTO ET AL  3,415,278

AUTOMATIC WATER VALVE DEVICE

Filed Aug. 16, 1966

INVENTORS.
MITITAKA YAMAMOTO
SABURO TAKECHI

BY

Kurt Kelman

AGENT 3,415,278
AUTOMATIC WATER VALVE DEVICE
Mititaka Yamamoto and Saburo Takechi, Otokuni-gun, Kyoto-fu, Japan, assignors to Tateisi Electronics Co., Ukyo-ku, Kyoto-shi, Japan, a corporation of Japan
Filed Aug. 16, 1966, Ser. No. 572,729
Claims priority, application Japan, Aug. 31, 1965, 40/71,862
3 Claims. (Cl. 137—607)

The present invention relates to a water valve device, and more particularly to an automatic water valve device which operates to detect electrically the approach of a human body and the like thereto so as to control the outflow of warm water by means of a magnetic valve automatically. The automatic water valve device in accordance with the present invention comprises three detecting antennae located suitably on an earthenware of the washer, three oscillators each connected to each of the three detecting antennae respectively, a hot water electromagnetic valve switching circuit unit and a cold water electromagnetic valve switching circuit unit.

According to the present invention, the present water valve device supplies cold water and hot water by the simultaneous control of the two electromagnetic valve switching circuit units through operating an oscillator connected to the first antenna. Furthermore, the present water valve device supplies cold water or hot water by the single control of the cold water electromagnetic valve switching circuit unit or the hot water electromagnetic valve switching circuit unit through operating the oscillator connected to the second antenna or the oscillator connected to the third antenna, respectively. Therefore, the present invention provides a novel water valve device which supplies easily water in the suitable temperature.

While the novel and distinctive features of the invention are particularly pointed out in the appended claims, a more expository explanation of the present invention in principle and in detail, together with additional objects and advantages thereof, is afforded by the following description and accompanying drawings.

Figure 2:
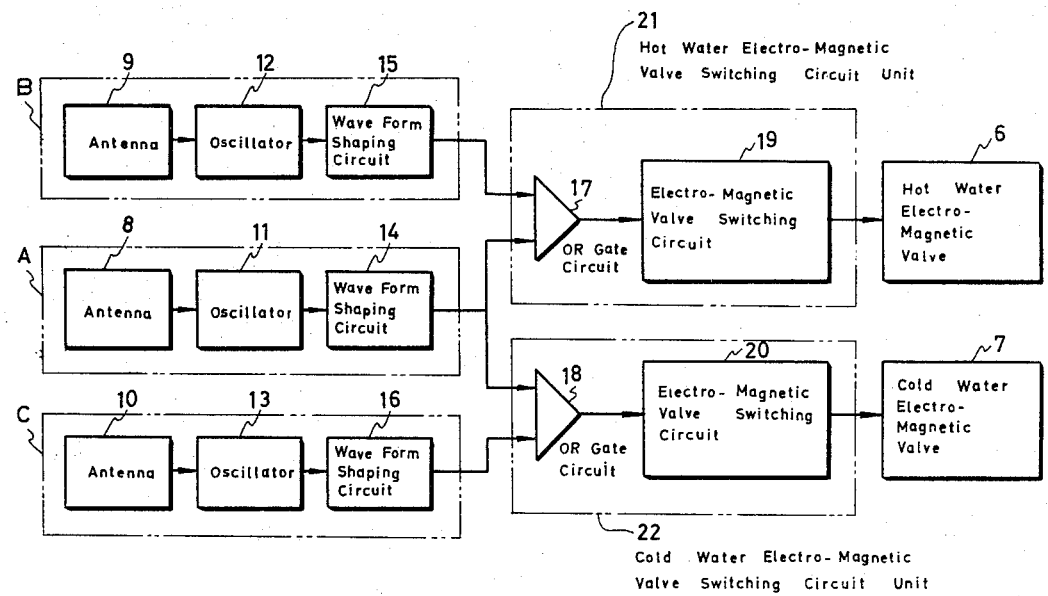

In the drawings:

FIG. 1 is a perspective view of an automatic water valve device embodied in accordance with the present invention, and FIG. 2 is a block diagram of the control system of the water valve device shown in FIG. 1.

Referring to the drawings, 1 is such a sanitary earthenware as a face basin or hand basin, 2 is a conduit which supplies hot water, 3 is a conduit which supplies cold water and 4 is a connecting tube which connects a cock 5 and conduits 2 and 3. 6 is a hot water electromagnetic valve and 7 is a cold water electromagnetic valve. 8, 9 and 10 are the first, second and third antennae respectively, which are located on the front panel of sanitary earthenware 1. 11, 12 and 13 are oscillators which are connected to antennae 8, 9 and 10 respectively. 14, 15 and 16 are wave form shaping circuits which operate to amplify and shape the outputs from oscillators 11, 12 and 13 respectively. As being apparent from FIGS. 1 and 2, antenna 8, oscillator 11 and wave form shaping circuit 14 constitute and antenna block A; antenna 9, oscillator 12 and wave form shaping circuit 15 constitute an antenna block B; and antenna 10, oscillator 13 and wave form shaping circuit 16 constitute an antenna block C. 17 and 18 are OR gate circuits, and 19 and 20 are electromagnetic valve switching circuits. OR gate circuit 17 and electromagnetic valve switching circuit 19 cooperate to construct a hot water electromagnetic valve switching circuit unit 21, and on the other hand, OR gate circuit 18 and electromagnetic valve switching circuit 19 cooperate to construct a cold water electromagnetic valve switching circuit unit 22.

It is noted that an output signal from the block A, said output signal being derived from a detecting signal in first antenna 8, is divided into two components so as to be transmitted to electromagnetic valves 6 and 7 through electromagnetic valve switching circuits units 21 and 22, respectively. As a result of this operation, electromagnetic valves 6 and 7 will be opened simultaneously to supply both hot water and cold water at cock 5.

On the other hand, it is noted that an output signal from the block B, said output signal being derived from a detecting signal at second antenna 9, is transmitted to hot water electromagnetic valve 6 through hot water electromagnetc valve switching circuit unit 21 so as to supply hot water only at cock 5, and that an output signal from the block C, said output signal being derived from a detecting signal at third antenna 10, is transmitted to cold water electromagnetic valve 7 through cold water electromagnetic valve switching circuit unit 22 so as to supply cold water only at cock 5.

It will be seen that such an automatic water valve device as constructed above can be mainly utilized for obtaining a mixture of cold water and hot water. When a human body approaches the first antenna, oscillator 11 operates to generate a signal. The signal is shaped to be a rectangular wave by shaping circuit 14. The rectangular wave signal from shaping circuit 14 will be applied to operate hot water electromagnetic switching circuit unit 21 and cold water electromagnetic switching circuit unit 22 so as to open hot water electromagnetc valve 6 and cold water electromagnetic valve 7 and thereby warm water will be supplied from cock 5. In case that the supplied warm water is lower in temperature than the desired temperature, or that it is desired to obtain hotter water than the supplied warm water, the human body may only approach the second antenna so that only the block B and the hot water electromagnetic valve switching circuit unit may operate to open hot water electromagnetic valve 6 and thereby to supply the hot water. On the other hand, in case that the supplied water is higher in temperature than the desired temperature or that it is desired to make the supplied water become less hot, the human body approaches third antenna 9 so that the block C and the water electromagnetic valve switching circuit unit to open the water electromagnetic valve 7 and thereby to supply the cold water.

As described in detail above, in accordance the present invention, the present invention provides an automatic water valve device which is able to supply automatically warm water by actuating the hot water electromagnetic valve switching circuit unit and the cold water electromagnetic valve switching circuit unit in the case of a human body approaching one of the three antennae located on the panel of the washer earthenware, and which is also able to adjust the supplied warm water in temperature by approaching one of the remainder two antennae.

What is claimed is:

1. An automatic water valve device comprising a first antenna block, the second antenna block, a third antenna block, a hot water electromagnetic valve switching circuit unit and a cold water electromagnetic valve switching circuit unit, wherein an output of the first antenna block controls simultaneously both the hot water electromagnetic valve switching circuit unit and the cold water electromagnetic valve switching circuit unit, an output of the second antenna block controls only the hot water electromagnetic valve switching circuit unit, and an output of the third antenna block controls only the cold water electromagnetic valve switching circuit unit.

2. An automatic water valve device comprising the first, second and third antennae located on a front side panel of a washer earthenware, first, second and third oscillators connected respectively to the antennae, a hot water electromagnetic valve switching circuit unit and a cold water electromagnetic valve switching circuit unit, wherein an output of the first oscillator controls simultaneously both the hot water electromagnetic valve switching circuit and the cold water electromagnetic valve switching circuit unit, an output of the second oscillator controls only the hot water electromagnetic valve switching circuit unit, and an output of the third oscillator controls only the cold water electromagnetic valve switching circuit unit.

3. An automatic water valve device comprising a first antenna block, a second antenna block, the third antenna block, a hot water electromagnetic valve switching circuit unit, a cold water electromagnetic valve switching circuit unit, a hot water electromagnetic valve to be driven by said hot water electromagnetic valve switching circuit unit, and a cold water electromagnetic valve to be driven by said cold water electromagnetic valve switching circuit unit, wherein each of said antenna blocks includes an antenna, an oscillator and a wave form shaping circuit, said hot water electromagnetic valve switching circuit unit including an OR gate circuit connected to said first and second antenna blocks and an electromagnetic valve switching circuit, said cold water electromagnetic valve switching circuit unit including an OR gate circuit connected to the first and third antenna blocks and an electromagnetic valve switching circuit.

References Cited

UNITED STATES PATENTS

| 3,151,340 | 10/1964 | Teshima | 4—166 |
| 3,333,160 | 7/1967 | Gorski | 340—258 |

LEONARD D. CHRISTIAN, *Primary Examiner.*

U.S. Cl. X.R.

137—558; 251—129; 4—166; 340—258